June 15, 1937.  A. P. FOX  2,083,599

SWIVEL JOINT

Filed March 23, 1935

Alexander P. Fox,
Inventor.
Delos G. Haynes,
Attorney.

Patented June 15, 1937

2,083,599

UNITED STATES PATENT OFFICE 2,083,599

SWIVEL JOINT

Alexander P. Fox, University City, Mo., assignor to Lincoln Engineering Company, St. Louis, Mo., a corporation of Missouri Application March 23, 1935, Serial No. 12,593

1 Claim. (Cl. 285—9)

This invention relates to swivels, and with regard to certain more specific features, to high pressure swivel joints for pipe which carries fluid under high pressure.

Among the several objects of the invention may be noted the provision of a swivel having packing means preventing leakage, and means for obtaining a relatively free rotation while the interior of the swivel is under pressure, and at the same time preserving said packing against distortion under various applications of extraneous force to the members of the swivel; and the provision of a device of the class described which is simple to manufacture and assemble and which is trouble-proof in operation. Other objects will be in part obvious and in part pointed out hereinafter.

The invention accordingly comprises the elements and combinations of elements, features of construction, and arrangement of parts which will be exemplified in the structures hereinafter described, and the scope of the application of which will be indicated in the following claim.

Figure 1:
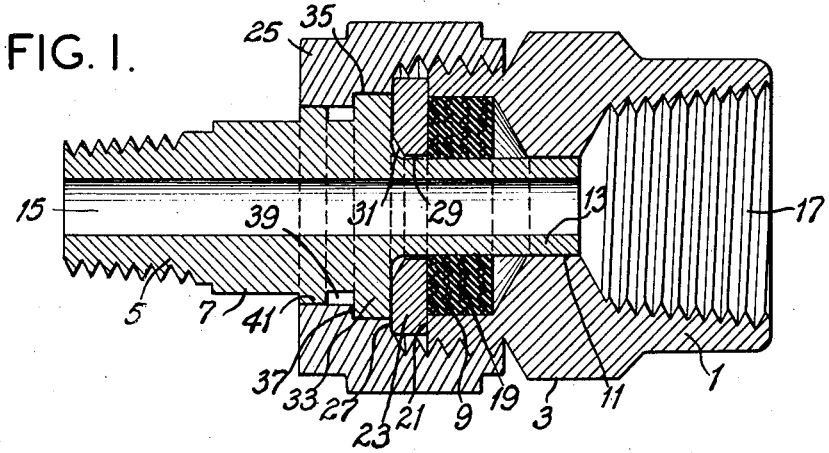
Figure 2:
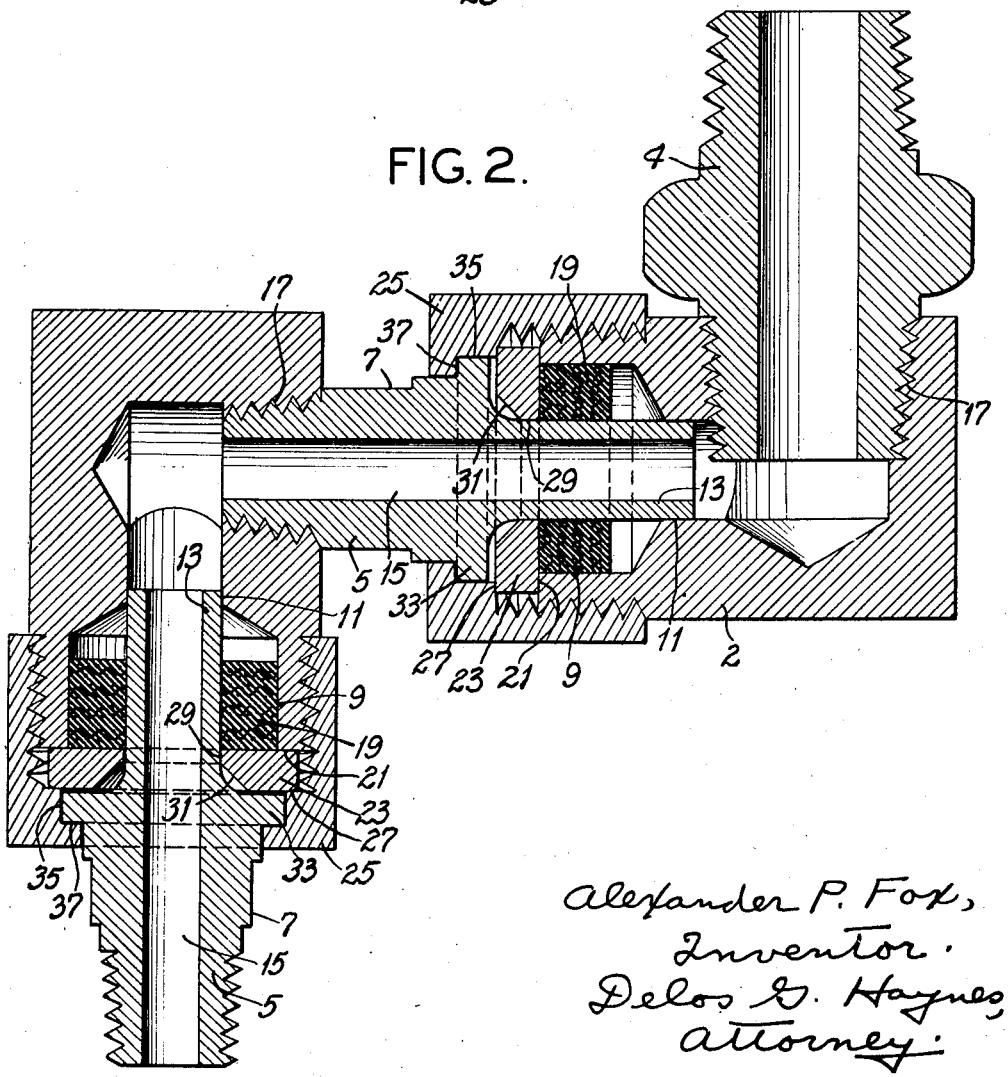

In the accompanying drawing, in which are illustrated two of various possible forms of the invention, Fig. 1 is a cross section showing a straight form of the invention; and, Fig. 2 is a section showing an angle type.

Similar reference characters indicate corresponding parts throughout the several views of the drawing.

Referring now more particularly to Fig. 1, there is shown at numeral 1 a threaded nipple having a wrench engaging portion 3, and at numeral 5 a second threaded nipple having a wrench engaging portion 7. These nipples 1 and 5 are to have a free swiveling relationship.

The nipple 1 is counterbored as shown at numeral 9 and at the base of the counterbore there is provided a reamed pilot bearing 11 which has a free, rotatable fit with a cylindric pilot extension 13 from said nipple 5. A passage 15 through the nipple 5 carries fluid and aligns with the passage 17 through the nipple 1.

The hollow extension 13 is accurately cylindric on its outside, thus forming with the counterbore 9, an annular recess for carrying a packing ring 19. This ring is resilient and preferably composed of laminations of radially arranged fabric integrated in resilient material.

The end of the counterbore 9 is provided with a faced portion 21 upon which forms a bearing for a metallic washer 23. A hollow nut 25 is screw threaded on to the portion of the nipple 1 which surrounds the counterbore 9. The nut 25 is provided with an internal shoulder 27, which screws down against the washer 23, holding the same tightly against the end of the counterbore 9.

The washer 23 has an opening 29 which freely accommodates the extension 13 and which is beveled rearwardly as shown at numeral 31. The bevel is preferable, though not necessary. It is preferable, because it permits of a filleted formation of the portion between said extension 13 and a flange 33 provided on said nipple 5. The flange 33 fits into a counterbore 35 of the nut 25. Directly behind the flange 33 is a bearing shoulder 37 on nut 25 for engaging the flange. The distance between the shoulder 37 and face of washer 23 is slightly greater than the thickness of the flange 33, thus permitting free rotation. The limited width of the shoulder reduces friction.

Behind the flange 33 is a peripheral recess 39 for reducing peripheral frictional contact, a flange 41 providing endwise steadying means.

From the above it will be seen that the nut 25 holds the washer 23 rigidly in connection with the counterbored portion of the nipple 1 so that a convenient, inwardly directed holding flange is effected by the washer for the packing 19. At the same time the nipple 5 carrying the radial flange 33 may be readily assembled with the nut 25 while a step-bearing is effected between the nipple 5 and the nut 25. It will be understood that the clearances between the flanges 33 and 41 and the surrounding portions are such as to permit free rotation.

Furthermore, the ability of the front end of the extension 13 to rotate without excessive play in the bearing portion 11, effects a guiding pilot action so that under extraneous forces on the nipples 1 or 5 there is no distorting strain placed upon the packing 19. It is to be understood that the bearing 11 is reamed and that the nipple 15 is suitably finished to provide accurate alignment and free rotation.

In Fig. 2 like numerals designate like parts. In this embodiment, however, there is substituted for the nipple 1, a body portion 2 having a side outlet with nipple 4, the nipple 5 extending into a similar body 2. In this embodiment the flange 41 and groove 39 are eliminated. The combination of the two swiveled joints arranged at right angles to one another effects a joint which is universal.

Attention is called to the simplicity with which the article may be manufactured. The washer 23 is in effect a fixed but removable flange associated with the nipple 1 and nut 25, its removability effecting ease of application of the packing 19 and ease of assembly of the rotatable, flanged nipple 5 within the nut 25.

The packing 19, it should be understood, is not compressed against the bottom of the counterbore 9 by the washer 23. This packing has a snug fit, both on the nipple extension 13 and against the wall of the counterbore 9. Thus when fluid leaks past the bearing 11, its leakage past the packing is incipiently prevented and thereafter pressure built up behind the packing within the counterbore presses the packing endwise. This causes the packing to expand radially to further increase the seal. However, none of these functions interferes deleteriously with the free rotation of the two parts at the bearing per se. The packing 19 is not of a type that transmits any hydraulic pressure to the nipple extension 13 by any direct radial component of compression, such as does the packing of U. S. Patent 1,460,154. The only radial force exerted by the packing on the nipple is that limited amount arising from some radial expansive response of the packing material to the axial compression on the packing effected by such hydraulic pressure as is exerted upon the packing. This is due to the shape of the packing which excludes any lip-like portion adjacent to and touching the nipple extension 13. The bearings are not used to take up the end thrusts caused by squeezing any packing.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

A swivel joint for high pressures, comprising a body portion having a counterbore and a pilot bearing at the inner end of said counterbore, a flanged nipple having its flange rotatably disposed between fixed flanges attached to the body portion, and a cylindrical extension rotatably disposed in said pilot bearing and having an axial passage therethrough, a substantially non-distortable packing in said counterbore resting against a fixed flange on the body and engaging the rotatable cylindrical extension on the nipple, the packing being so shaped that the pressure exerted by the fluid on the packing is transmitted to the body member and the fixed flange and so that the only radial force exerted by the packing on the nipple is that force which is indirectly received by way of the axial compression of the packing material.

ALEXANDER P. FOX.